United States Patent
Koukal

(10) Patent No.: US 8,869,706 B2
(45) Date of Patent: Oct. 28, 2014

(54) BELLOWS

(75) Inventor: Claus-Ekkehard Koukal, Kassel (DE)

(73) Assignee: Hübner GmbH, Kassel (DE)

( * ) Notice: Subject to any disclaimer, the term of this patent is extended or adjusted under 35 U.S.C. 154(b) by 1064 days.

(21) Appl. No.: 12/516,695

(22) PCT Filed: Dec. 7, 2007

(86) PCT No.: PCT/DE2007/002211
§ 371 (c)(1),
(2), (4) Date: May 28, 2009

(87) PCT Pub. No.: WO2008/077368
PCT Pub. Date: Jul. 3, 2008

(65) Prior Publication Data
US 2010/0075085 A1    Mar. 25, 2010

(30) Foreign Application Priority Data

Dec. 23, 2006 (DE) .......................... 10 2006 061 503

(51) Int. Cl.
*B61D 17/22* (2006.01)
*B60D 5/00* (2006.01)

(52) U.S. Cl.
CPC . *B60D 5/00* (2013.01); *B61D 17/22* (2013.01)
USPC ................ 105/18; 105/8.1; 105/15; 280/403; 267/118; 267/122; 442/65; 442/86; 442/87; 442/164; 442/168; 442/169; 442/312; 442/313

(58) Field of Classification Search
USPC ............... 442/65, 86, 87, 164, 168, 169, 312, 442/313; 105/8.1, 15, 18; 280/403; 267/118, 122

See application file for complete search history.

(56) References Cited

U.S. PATENT DOCUMENTS

| | | | | |
|---|---|---|---|---|
| 3,048,198 | A | * | 8/1962 | Koppelman et al. ...... 139/384 R |
| 3,090,406 | A | * | 5/1963 | Koppelman et al. .......... 428/119 |
| 5,033,395 | A | * | 7/1991 | Bechu et al. .................... 105/18 |
| 5,175,034 | A | * | 12/1992 | Andre De La Porte et al. ............................ 428/36.1 |
| 6,457,702 | B1 | * | 10/2002 | Oishi ............................ 267/122 |

FOREIGN PATENT DOCUMENTS

| | | |
|---|---|---|
| DE | 28 39 775 A1 | 3/1980 |
| DE | 100 26 405 A1 | 12/2000 |
| EP | 0 339 227 A2 | 11/1989 |
| EP | 0 389 934 A1 | 10/1990 |

* cited by examiner

*Primary Examiner* — Andrew Piziali
(74) *Attorney, Agent, or Firm* — Panitch Schwarze Belisario & Nadel LLP

(57) ABSTRACT

A bellows is provided as part of a crossway between two vehicles connected to each other in an articulated manner or as a telescopic gangway, with a material web which is provided with a layer of synthetic material. The material web has a top (upper) side made of a textile and a bottom (under) side made of textile (11, 12). The spacer fibers/pile threads (13) are provided between the top side and the bottom side, such that a space between the top side and bottom side results when the material web is in a non-loaded condition.

12 Claims, 2 Drawing Sheets

BELLOWS

CROSS-REFERENCE TO RELATED APPLICATIONS

This application is a Section 371 of International Application No. PCT/DE2007/002211, filed Dec. 7, 2007, which was published in the German language on Jul. 3, 2008, under International Publication No. WO 2008/077368 A1 and the disclosure of which is incorporated herein by reference.

BACKGROUND OF THE INVENTION

The present invention relates to a bellows as a part of a connection between two hinge-linked vehicles or of an aircraft boarding bridge.

A web of material for manufacturing a bellows is known. Usually, such a web of material consists of two fabric layers, the fabric layers being coated with an elastomer that is vulcanized after application. However, what are referred to as silicone-coated material webs are also known.

To stabilize the bellows, both on a corrugated and on a pleated bellows, peripheral frames are provided for taking hold of the web of material in a clamping manner in the region of the edges. These frames are made from aluminum and take hold of the web of material in a clamping manner. In order to ensure the required tightness of the bellows, a sealing material is provided in the region of the frame in order to prevent water penetration. In order to further ensure that the frame does really permanently take hold of the webs of material grasped by the frame, the frame is beaded over its length in the region of the webs of fabric. Furthermore, the webs of material comprise inserts in the region of the corners. That is, the bellows, namely both in the form of a corrugated bellows and in the form of a pleated bellows, are provided with special inserts in the corner region. The reason therefor is that the bellows are subject to increased load in the corner region.

It appears from the above that the manufacturing of a bellows is very complex, which makes such a bellows quite expensive. In order to reduce the costs, it is already known to make such bellows between two hinge-linked vehicles with only one single fabric web. The fabric is then subjected to plastic deformation, the result of plastic deformation being that the spaces between the discrete threads substantially disappear. In this regard, less coating material is needed since this coating material, be it an elastomer that is vulcanized subsequently or a silicone, can be applied in a thinner layer, so that the bellows is relatively lighter. To this extent, it is not necessary to provide a peripheral frame for stabilization in each pleat or corrugation of a pleated or corrugated bellows. However, the insulating effect, in particular with respect to sound, is lower than the insulation in a bellows having a double-layer fabric web.

BRIEF SUMMARY OF THE INVENTION

It is an object of the invention to provide a web of material for manufacturing a bellows as part of a connection between two hinge-linked vehicles, such a bellows having to meet different requirements, namely:
considerable flexibility;
shape stability;
good insulation properties, in particular with respect to sound and temperature;
easy manufacturing and easy mounting.

To achieve this object, it is proposed, in accordance with the invention, that the web of material comprises a textile upper side and a textile under side, spacer threads being provided between upper and under sides for a spacing to form between upper and under sides in the unloaded condition of the web of material. A web of material made in this way is also known under the name of spacer fabric or knit fabric (See German published patent application DE 100 26 405 A1). This material is not so much a woven fabric but rather a knit fabric. The reason therefor is that both the upper and the under sides are configured to be a knit fabric and that, in addition thereto, also the pile yarns, which provide the spacing, are intermeshed with the upper and the under sides. It is precisely this intermeshing and the arrangement of the pile yarns between the textile upper and under sides that give such a three-dimensional fabric an excellent flexibility. The flexibility is higher the longer the pile yarns between upper and under sides. After a plastic coating of the upper and/or of the under side, such a fabric is also substantially tight, quite similar to the known webs of material for manufacturing bellows.

After coating, the material for a bellows is also characterized in that it has a high insulation effect, namely both with respect to sound and with respect to temperature. The reason therefor is that there is quite a large space filled with air or with foam between the upper and the under sides.

The structure of the textile upper and/or under side is such that penetration of coating material is largely prevented. As already discussed above, an elastomer, such as a silicone rubber comes into consideration as the coating material. If this coating material were to penetrate into the material, meaning into the spacer fabric, what is referred to as a platen formation would occur, which would restrict the elasticity of such a web of material in such a manner that it could hardly be utilized as a bellows, be it a corrugated or a pleated bellows.

The textile or spacer knit fabric configured to be a knitwear is further characterized in that parallel lanes are provided in a determined spaced-apart relationship with respect to each other between the discrete pile yarns, the size of the lanes being, besides the height of the pile yarns, of paramount importance for the intrinsic elasticity of such a material. The lanes can receive supporting frames that run correspondingly parallel to each other. This means that the supporting frames extend inside the fabric and are also fixed inside the fabric by the pile yarns in the longitudinal direction of the bellows. A bellows made in this way allows for inexpensive manufacturing, since special measures for fixing the frames to the bellows material, in order to achieve the required stiffness of the bellows, as required in the prior art, are no longer needed. Furthermore, substantially no sewing is needed, whereas in the prior art, the discrete pleats or corrugations must be stitched down with twin seams. Separate inserts are partially sewn thereon in the corner region.

All this may be obviated since the frames are guided in the interior of the bellows material. No tightness problems are associated therewith, whereas according to the prior art, special measures must be taken in the region of the seams, e.g., by applying a sealing lacquer, in order to ensure the required tightness. In this regard, such a bellows can be made at quite low cost. A bellows made in this way additionally comprises a high insulation effect both against sound and against temperature, because of the already mentioned quite thick air layer between the upper and the under sides of the three-dimensional woven or knit fabric. The supporting frames for supporting the bellows, which are received by the bellows fabric, are substantially configured to be peripheral, conforming to the cross sectional contour of the bellows; however, they are open at one end in order to be capable of putting them over the hinge.

In order to increase fire resistance, the material is preferably made from meta-aramid or from para-aramid. In this context, it has been found that the arrangement of the lanes offers the following advantage: fire tests have shown that the gases generated when the material is smoldering are carried downward in the lanes where they can then exit, since the bellows is open at the bottom. Accordingly, the lanes do not act as a fire accelerator through oxygen supply as one may assume; instead, the noxious gases generated are evacuated through the lanes.

Traction means may also be arranged in the lanes, so as to alternate with the supporting frames, which are configured in the shape of rods or tubes. This means a supporting frame respectively alternates with a traction means, such as a wire rope or an elastic rope. As an effect of the arrangement of supporting frames in the lanes, the bellows does not sag on the one hand, and the supporting frames ensure on the other hand that the bellows can be pleated properly. If elastic ropes, for example, which are tension biased, are now threaded in so as to alternate with the supporting frames, one achieves on the one hand a weight-saving, since the ropes are generally lighter than frames made from solid material or even lighter than tubular frames. On the other hand, a pre-biased traction rope, which constricts the bellows there, causes a fold line for a pleat to form there.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
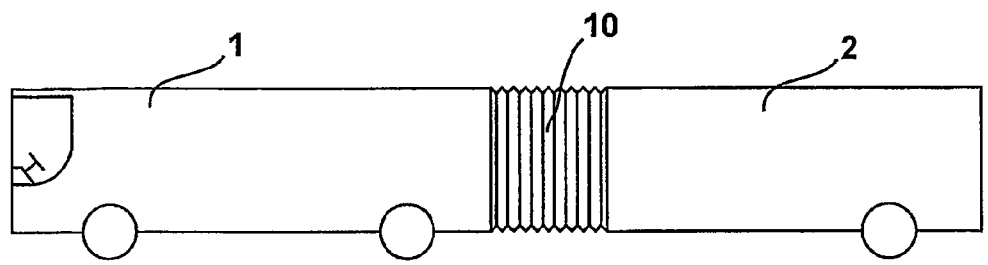
FIG. 1 is a schematic representation of an articulated bus in a side view.

FIG. 1 schematically shows a bus having a front section 1 and a rear section 2, which are connected together by a connection having a bellows 10.

Figure 2:
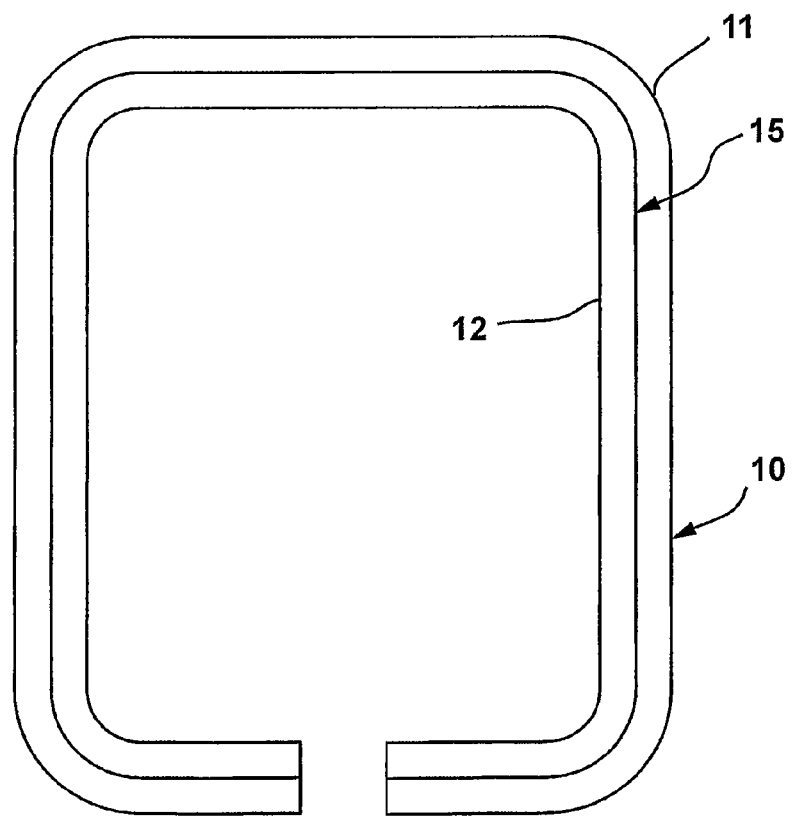
FIG. 2 is a schematic section through the bellows of an articulated bus.

Such a bellows is shown in a schematic cross sectional view in FIG. 2. The bellows is hereby characterized by a textile upper side 11 and by a textile under side 12, which are connected together by pile yarns 13 and which are concurrently kept at a distance by the pile yarns 13 (see FIGS. 3 and 4). The pile yarns 13, which are intermeshed with the upper and the under side, are spaced apart in the axial direction of the bellows, so that spaces in the form of lanes 16 occur for passing the supporting frame 15 therethrough. The size of the lanes 16 may hereby be chosen such that the frame 15 is secured in place by the pile yarns 13 forming the lanes 16 without compromising the elasticity of the material or of a bellows made in this way. Optionally, traction ropes 17 may also be provided to alternate with supporting frames 15.

Figure 3:
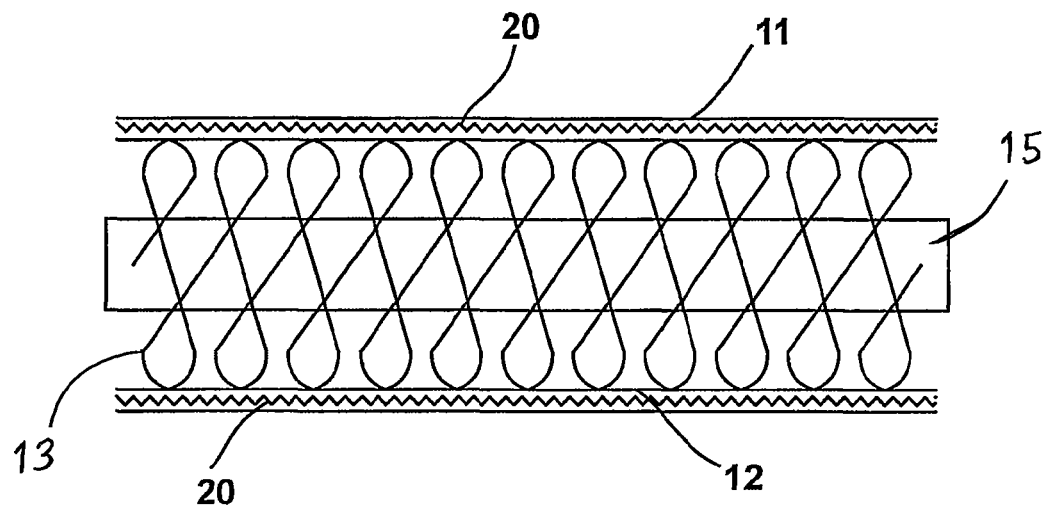
FIG. 3 is a sectional side view of the spacer fabric according to an embodiment of the invention.
Figure 4:
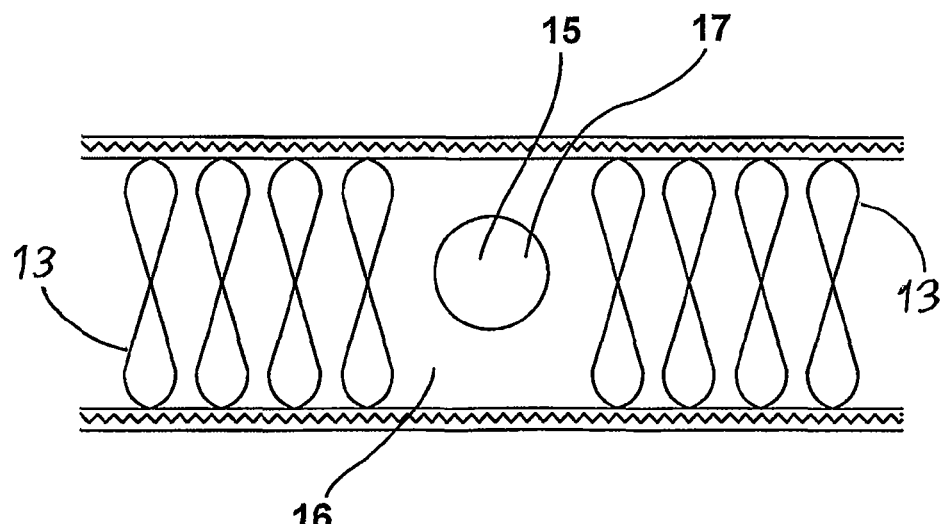
FIG. 4 is a sectional end view of the spacer fabric shown in FIG. 3.

The configuration of the pile yarns and the arrangement of the pile yarns between the textile upper and under side 11, 12 is particularly evident when reviewing FIGS. 3 and 4. In particular, FIG. 4 shows a side view of the fabric shown in FIG. 3, and in this regard also a lane 16, which serves for receiving the frame 15 or the traction rope 17. In the lower region of the frame 15, the frame 15 comprises locking means (not shown), in order to be capable of placing such a bellows with a frame onto the articulation connecting the two vehicle sections in the open condition. The bellows 10 itself can be connected with a hook and loop tape after it has been placed over the articulation.

The upper and the under sides of the material are preferably provided with a coating 20, which is applied in such a manner that this coating 20 is seated on the textile upper and under sides, but does not penetrate into the fabric as such, meaning that it does not reach the region of the pile yarns. This would inevitably lead to an extreme stiffening of such a web of material, which would also considerably gain in weight. This means that the textile upper and under sides are chosen so as not to be so tight that the coating material cannot penetrate, but they are still configured such that the coating material continues to adhere to the upper or to the under side of the web of material. The spacing between the upper and the under sides determines the insulation effect with respect to sound and also with respect to temperature.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A passageway connection bellows comprising:
a web of material having a plastic coating, the web of material having a corrugated or pleated configuration, the web of material comprising a textile upper side and a textile under side, and pile yarns acting as spacer threads between the upper side and the under side to form a spacing between the upper side and the under side in an unloaded condition of the web of material, the web of material having lanes extending at spaced-apart intervals between the pile yarns; and
supporting frames which run parallel to each other and are disposed in the spaced-apart lanes.

2. The bellows as set forth in claim 1, wherein at least one of the textile upper side and the textile under side has a structure that prevents a material of the plastic coating from penetrating through the upper side and/or the under side.

3. The bellows as set forth in claim 1, wherein the web of material comprises a fire resistant material selected from meta-aramid and para-aramid.

4. The bellows as set forth in claim 1, wherein the supporting frames are configured to be peripheral so as to conform to a cross-sectional contour of the bellows.

5. The bellows as set forth in claim 4, wherein the supporting frames can be opened.

6. The bellows as set forth in claim 1, wherein the supporting frames are rod-shaped or tubular.

7. The bellows as set forth in claim 1, wherein the web of material has a plurality of lanes, and the lanes receive the supporting frames and a traction rope in an alternating fashion.

8. The bellows as set forth in claim 7, wherein the traction rope comprises a cable rope.

9. The bellows as set forth in claim 7, wherein the traction rope comprises an elastic rope.

10. The bellows as set forth in claim 1, wherein the web of material comprises a spacer knit fabric.

11. The bellows according to claim 1, wherein the bellows is part of a connection between two hinge-linked vehicles.

12. The bellows according to claim 1, wherein the bellows is part of an aircraft boarding bridge.

\* \* \* \* \*